Figure 1:
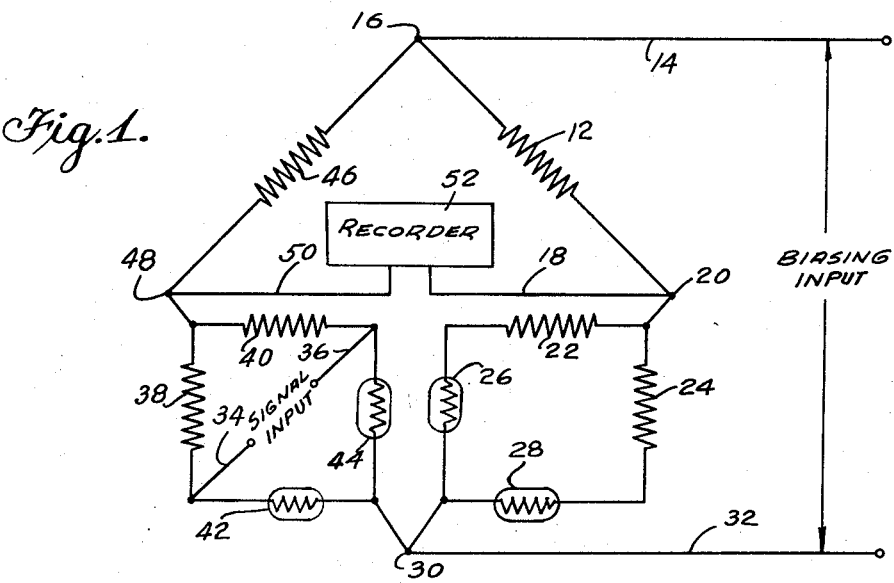

Aug. 2, 1960 L. W. SEPMEYER 2,947,935
MEANS FOR MEASURING THE ROOT MEAN SQUARE
VALUE OF A COMPLEX ELECTRICAL WAVE
Original Filed Aug. 21, 1952

INVENTOR.
Ludwig W. Sepmeyer
BY
G R McCrady
ATTORNEYS.

United States Patent Office 2,947,935
Patented Aug. 2, 1960

2,947,935

MEANS FOR MEASURING THE ROOT MEAN SQUARE VALUE OF A COMPLEX ELECTRICAL WAVE

Ludwig W. Sepmeyer, 1862 Comstock Ave., Los Angeles, Calif.

Continuation of application Ser. No. 305,717, Aug. 21, 1952. This application Sept. 5, 1956, Ser. No. 608,654

1 Claim. (Cl. 323—75)

(Granted under Title 35, U.S. Code (1952), sec. 266)

The invention described herein may be manufactured and used by or for the Government of the United States of America for governmental purposes without the payment of any royalties thereon or therefor.

This invention, a continuation of U.S. patent application Serial No. 305,717, filed August 21, 1952, now abandoned, relates to a measuring instrument of the type wherein the temperature coefficient of resistance of a thermal element in an electrical bridge is changed in a well defined manner by the variable to be measured.

It is desirable in several fields of measurement to be able to measure the root mean square (hereinafter abbreviated as R.M.S.) value of a complex electrical wave. This is especially true in acoustic noise measurements. Most of the available instruments for measuring waves are of the average reading and peak reading types. On complex waves these available instruments give readings which are dependent not only upon the number of components in the wave, but also on the relative phase shift between the components. In order to be useful for acoustic measurements, the R.M.S. detecting element must have a time constant less than one-tenth second; a time constant of ten milliseconds or less is preferred for recording data on a fast graphic recorder of the power level type. The most familiar known type of R.M.S. type of instrument is the thermocouple which is characterized by slow response due to thermal inertia of the heater and low safety margin to overload. Another disadvantage of the thermocouple is the extremely low output thereof which calls for a very sensitive D.C. amplifier and its concomitant difficulties. The same objections of slow response and low output also apply to devices making use of electrostatic and electromagnetic attraction; vacuum tubes which exhibit square-law transfer characteristics have a very limited peak-to-R.M.S. capability and the useful characteristics are available only at a critical grid bias and screen voltage. In the instant invention, the detecting thermal element comprises a length of small diameter wire as a resistance element which is arranged in a suitable circuit to provide a highly sensitive R.M.S. meter.

An object of the invention is to provide an improved apparatus wherein the characteristics of a resistive impedance are utilized for indicating the R.M.S. value of a complex wave over a wide frequency range.

Other objects and many of the attendant advantages of this invention will be readily appreciated as the same becomes better understood by reference to the following description.

Figure 2:
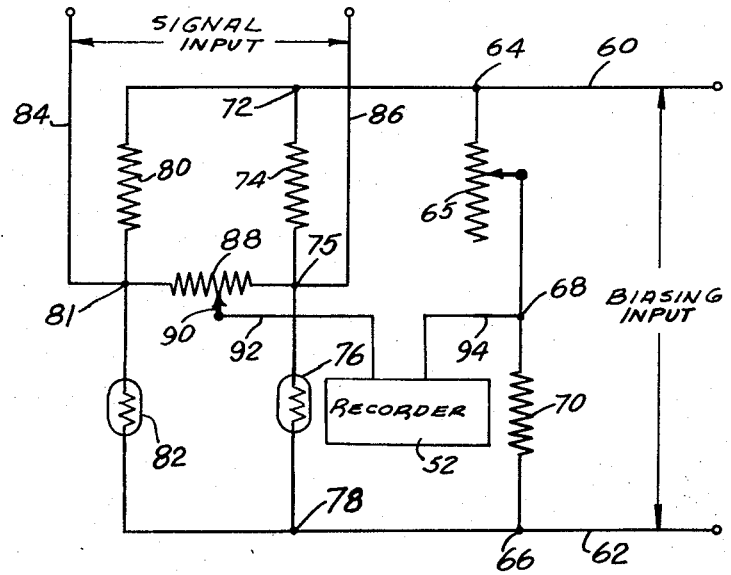

Fig. 1 is a schematic diagram showing the thermal element in relation to the circuit components with which it is used; and Fig. 2 is a similar diagram of a modified form of the invention.

The circuit shown in Fig. 1 comprises a Wheatstone bridge having as one arm a fixed resistor 12 which is connected to the biasing input lead 14 at point 16 and to the signal output lead 18 at point 20. The second arm of the first side of said bridge includes fixed resistors 22 and 24 and thermal elements 26 and 28 connected as shown to point 20 and to point 30. A second biasing input lead 32 is also connected to point 30. The second side of the bridge is identical with the first side except for the addition of signal input leads 34 and 36 connected across the series-parallel arrangement of fixed resistors 38 and 40 with thermal elements 42 and 44. Fixed resistor 46 is connected into the bridge at point 16 and at point 48 to which the second signal output lead 50 is connected. Thermal elements 26, 28, 42 and 44 in this instance may be short lengths of very fine wire. A 35 micro-inch diameter platinum Wollaston wire gives very good results. The response time of such an element in air is about one millisecond; this time may be shortened by placing the wire in an atmosphere of hydrogen or helium. The thermal elements must be selected for matching characteristics both as to the total resistance and as to the change in resistance with increase in temperature. A six millimeter length of one micron wire will have a nominal resistance of about 2,000 ohms for one element. With a 2.5 milliamperes current flow through the elements provided through biasing input leads 14 and 32, a maximum signal output voltage of slightly over one volt may be attained from a circuit using such elements. The direct current passing through the thermal elements behaves as a bias to maintain the elements at a suitable operating value; this bias is selected to be about one-half of the total current which the thermal elements will safely carry. The low thermal inertia of the meter is attributable to the very small diameter of the thermal element wires.

In the operation of the circuit thus far described, a steady D.C. biasing input voltage is applied to leads 14 and 32. Assuming no signal input voltage is applied to leads 34 and 36, the bridge will be balanced and no potential difference will exist between points 20 and 48. The bridge will remain in balance even though the ambient temperature may change since the resistance of the two similar arms of the bridge will vary in the same manner. The sole purpose of the thermal elements in the right hand side of the bridge is to correct for ambient temperature variations; it is evident that the compensating circuit comprising impedances 22, 24, 26 and 28 may be replaced by a single fixed resistor if the ambient temperature changes are small. If an A.C. signal input voltage is applied to leads 34 and 36, the distribution of current through the bridge will be changed because the temperature of thermal elements 42 and 44 will increase and their resistance will increase accordingly. This increase in resistance in one side of the bridge creates an unbalance and a potential difference will result between points 20 and 48. The output of leads 18 and 50 may be applied to external circuitry such as any of the various known types of indicating or recording means, for example a fast graphic recorder 52. Since the ratio of the resistance of resistor 38 to that of resistor 40 is the same as the ratio of the resistance of thermal element 42 to that of thermal element 44, the internal bridge comprising these impedances is balanced with respect to the input signal and there can be no potential difference between points 30 and 48. If a single thermal element were to be used as one arm of a bridge, the input signal would appear at the output of the bridge at a much higher level than the signal caused by the heating effect. As long as the elements in the internal bridge are equal over their whole operating range, all odd order signals will be balanced and will not appear in the output of the main bridge.

An embodiment of the circuit which is particularly well adapted to balanced-to-ground amplifiers is shown in Fig. 2. A biasing D.C. power input is fed through leads 60 and 62 to points 64 and 66, respectively. At point 64 the current divides, one part passing through rheostat 65 to point 68 and thence to point 66 through fixed resistor 70. The other part of the current passes to point 72 where it divides again, a part of the current going through resistor 74, point 75, and thermal element 76 to point 78 and thence to point 66 while the other part goes through resistor 80, point 81, and thermal element 82 before reaching point 78. The A.C. signal input leads 84 and 86 are connected to points 81 and 75 respectively. Potentiometer winding 88 is connected across signal input leads 84 and 86; potentiometer slider 90 is connected to lead 92 which, with lead 94, provides means for connecting the signal output of the arrangement to an external unit such as, for example, a fast graphic recorder 52 as in the Fig. 1 embodiment. The resistance of impedances 65, 70, 74 and 80 is made large in this embodiment in comparison to the resistance of thermal elements 76 and 82 so that the elements will operate under constant D.C. bias conditions and also so that little A.C. power is lost in the elements. This difference is not essential for proper operation of the apparatus. Resistor 70 may be replaced by a thermal element to provide complete ambient temperature compensation for the apparatus.

In the operation of the above described apparatus, an A.C. signal input voltage is applied to leads 84 and 86, and a biasing D.C. input voltage is connected to leads 60 and 62. Rheostat 65 is adjusted so that the same D.C. potential exists at point 68 and slider 90. The location of slider 90 has substantially no effect on this adjustment. Potentiometer slider 90 is then adjusted so that no part of the input A.C. signal can be detected between point 68 and slider 90. This feature of adjustability makes it possible to compensate for small differences which exist between thermal elements. It has been found that the A.C. balance holds good over long periods of time.

Since the thermal elements as well as the other circuit components are resistive impedances, high frequencies may be handled. The upper limit, which is in the microwave range, is limited by such phenomena as skin effects and standing waves, and there is no lower frequency limit since the apparatus operates perfectly on D.C. input signals. Although short thermal time constants may not be required for many applications, it is highly desirable to be able to select any time constant over a wide range which can be done by means of well known integrating circuitry. The output of the R.M.S. meter may be fed into other units, such as a differential amplifier of the D.C. type or of the chopper amplifier type. The output of the meter may also be utilized in a servo system to maintain a signal at a constant specified level.

Other elements characterized by electrical resistance values which are dependent upon temperature or applied current or voltage, including non-metallic thermal elements such as bead thermistors, may be used in the described apparatus. In general, however, they are presently judged to be less effective. In the case of the bead thermistor, for example, the time constant is longer than when wire is used because the resistance material is on a base which takes an appreciable time to heat up. The fact that certain such elements may have a negative temperature coefficient of resistance is of no consequence in this application. It should also be noted that the apparatus shown in Figs. 1 and 2 will operate on an A.C. biasing input supplied to leads 14, 32 in Fig. 1, and to leads 60, 62 in Fig. 2, correspondingly providing A.C. carrier outputs, but D.C. biasing input is preferred.

Obviously many modifications and variations of the present invention are possible in the light of the above teachings. It is therefore to be understood that within the scope of the appended claim the invention may be practiced otherwise than as specifically described.

What is claimed is:

An electrical apparatus for deriving the time-variable root-mean-square values of a complex input voltage, comprising: an electrical network having four bridge-connected arms, two adjoining arms of said network having thermally-responsive elements each having an electrical resistance which is dependent upon the temperature of said elements in response to current therethrough, and said elements each having a thermal time costant which is short relative to the periods in which variations in said root-mean-square values occur, the other two adjoining arms having like resistance, means for applying a bridge-energizing voltage between the junction of said two adjoining arms having thermally-responsive elements and the junction of said other two adjoining arms, first resistive means connected between said junctions and having an output terminal connected to a variable intermediate point thereof, second resistive means connected between the remaining two junctions of said bridge-connected arms and having an output terminal connected to a variable intermediate point thereof, and means for applying said complex input voltage between said remaining two junctions, whereby said electrical apparatus provides at said output terminals a time-variable output voltage corresponding to and serving as a measure of the time-variable root-mean-square values of said complex input voltage.

References Cited in the file of this patent

UNITED STATES PATENTS

| | | |
|---|---|---|
| 2,459,104 | Gilbert | Jan. 11, 1949 |
| 2,487,697 | Conviser | Nov. 8, 1949 |
| 2,525,179 | Polye | Oct. 10, 1950 |